US005948197A

United States Patent [19]

Marschke

[11] Patent Number: 5,948,197

[45] Date of Patent: Sep. 7, 1999

[54] AIR PRESSURE ASSISTED BELTLESS HOLDDOWN FOR DOUBLE BACKER

[75] Inventor: Carl R. Marschke, Phillips, Wis.

[73] Assignee: Marquip, Inc., Phillips, Wis.

[21] Appl. No.: 09/034,671

[22] Filed: Mar. 4, 1998

[51] Int. Cl.[6] .............................. B32B 31/00; B31F 1/22

[52] U.S. Cl. ........................... 156/205; 34/634; 156/210; 156/470

[58] Field of Search .................................... 156/285, 205, 156/462, 470, 382, 583.3, 210; 34/634, 646; 425/DIG. 2; 198/811; 226/97.3; 242/615.11

[56] References Cited

U.S. PATENT DOCUMENTS

| | | | |
|---|---|---|---|
| 3,319,353 | 5/1967 | Matsunami et al. | 34/155 |
| 3,340,125 | 9/1967 | Drenning et al. | 156/274 |
| 4,889,580 | 12/1989 | Seki et al. | 156/382 |
| 4,947,559 | 8/1990 | Basler et al. | 34/70 |

FOREIGN PATENT DOCUMENTS

| | | |
|---|---|---|
| 1046813 | 4/1964 | United Kingdom . |

*Primary Examiner*—Michael W. Ball
*Assistant Examiner*—Gladys Piazza
*Attorney, Agent, or Firm*—Andrus, Sceales, Starke & Sawall

[57] ABSTRACT

An essentially non-contact holddown system for a corrugator double backer utilizes air pressure supplied by a plenum positioned above and closely spaced from the lower heating section which supports the corrugated web. Continuous edge sealing membranes seal the interface between the lateral edges of the plenum and the web, and overlie the edges of the web so that the seal is enhanced by the holddown pressure.

11 Claims, 2 Drawing Sheets

AIR PRESSURE ASSISTED BELTLESS HOLDDOWN FOR DOUBLE BACKER

BACKGROUND OF THE INVENTION

The present invention relates to a double backer for the formation of a double face corrugated web and, more particularly, to an improved system for providing a vertical pressure to the surface of the web moving through a double backer heating section while minimizing the vertical load.

In a conventional double backer, a liner web is brought into contact with the glued flute tips of a single face corrugated web, and the freshly glued double face web is then passed over the coplanar surfaces of a number of serially arranged heating units, usually steam heated, to cause the starch-based glue to cure and to drive moisture from the web. For many years, double face web travel over the flat heated surfaces of the heating units was typically provided by a wide driven holddown belt in direct contact with the upper face of the corrugated web. The top face of the holddown belt, in turn, is held in contact with the moving web by any of several types of load or force applying devices. For example, the holddown belt may be engaged by a series of weighted ballast rollers, or it may be forced into contact with the web by air pressure from a system of nozzles positioned over the belt, or an arrangement of inflatable air bladders may be used to press the moving holddown belt into contact with the web.

The use of a driven holddown belt has always been encumbered with a number of disadvantages. The belt must be mounted for continuous travel in the manner of a conventional conveyor belt system and, therefore, must also include a separate belt drive. The holddown belt also must necessarily overlie the entire surface of the double face web through the heating section and, as a result, may actually inhibit the escape of moisture from the web as it dries. Also, the edges of the belt which overhang the edges of the corrugated web tend to crush the edges and also undesirably run in contact with the heating surfaces laterally beyond the moving web.

More recently, a double backer has been developed in which the driven holddown belt has been eliminated. A stationary holddown mat is supported by its upstream and downstream ends which are vertically adjustable to allow a selected portion of the mat to hang in catenary fashion on the upper surface of the corrugated double face web traveling through the heating section. The web is typically pulled through the heating section by a downstream vacuum conveyor.

Systems utilizing moving holddown belts are both cumbersome and costly. The improved stationary direct contact holddown systems, though providing significant improvements over holddown belt systems, require a web drive system with fairly high operating power requirements.

SUMMARY OF THE INVENTION

In accordance with the present invention, a double backer operates without a holddown belt and the holddown force is provided with air pressure applied directly to the upper web surface. The apparatus of the present invention comprises an open-bottom plenum which overlies the web in the heating section and is supported in vertical closely spaced relation to the heating surfaces, a heating unit mounted in the plenum to provide uniform distribution of heat to the upper surface of the web, a source of pressurized gas connected to the plenum, a gas distribution arrangement which provides a uniformly distributed downwardly directed force against the upper surface of the web, and flexible edge sealing members which extend along both lateral edges of the plenum and laterally inwardly to free inner edges which overlie the respective outer lateral edges of the web.

The heating devices for the heating section and for the heating unit in the plenum are preferably steam heated. The pressurized gas preferably comprises compressed air and the distribution arrangement comprises an array of high velocity air nozzles.

In accordance with the preferred embodiment, the edge sealing members comprise a pair of membranes each having an outer edge which is attached along one lateral edge of the plenum and an inner edge which rests on an immediately adjacent edge portion of the paperboard web. The membranes are attached to the plenum by a continuous seam. The plenum comprises a housing having a length approximately equal to the length of the heating surface and includes upstream and downstream ends attached to respective upstream and downstream supports. Each of the supports includes a lift device adapted to move the plenum and the edge sealing members vertically and to adjustably set the plenum in operative position over the heating surfaces. The edge sealing membranes may be tensioned in the machine direction to hold them in place. The plenum may be enclosed by an insulating layer. The plenum is also provided with upstream and downstream end seals which sealingly engage the web to close the respective ends of the plenum against air loss.

In accordance with the method of the present invention, a holddown force is applied to a corrugated paperboard web moving over and in contact with the heating surfaces in the heating section of a double backer in accordance with the steps of (1) suspending an openbottom plenum over the web in the heating section, (2) heating the interior of the plenum, (3) pressurizing the plenum to provide a uniformly distributed force against the upper face of the web, and (4) sealing the interface between the lateral edges of the plenum and the web with flexible edge sealing members overlying the lateral edges of the web. The method preferably also includes the step of sealing the upstream and downstream ends of the plenum with flexible end seals.

DETAILED DESCRIPTION OF THE PREFERRED EMBODIMENT

Figure 3:
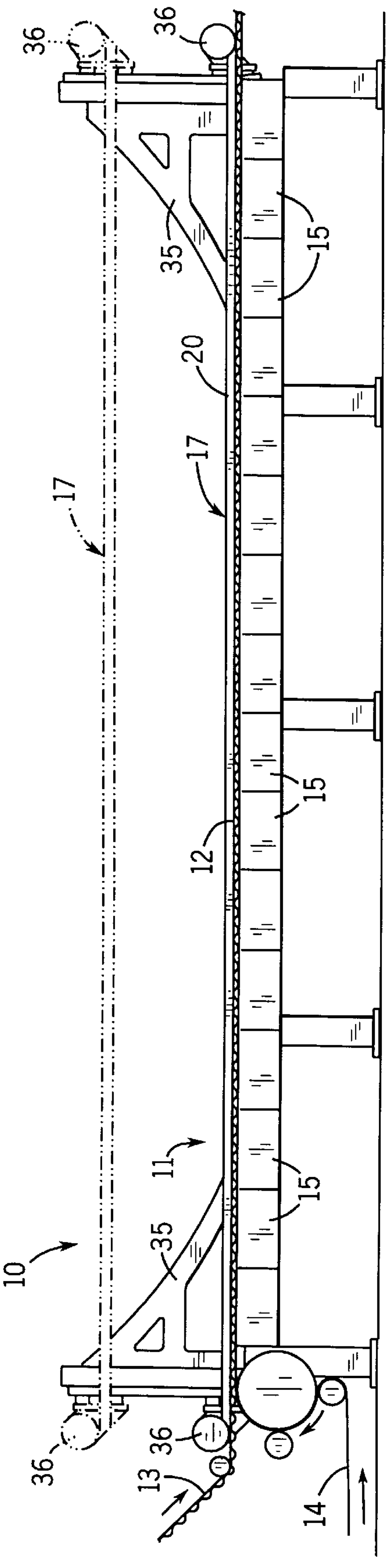
FIG. 3 is a generally schematic side elevation view of the double backer of the present invention.

In the generally schematic representation in FIG. 3, there is shown a double backer 10 having a lower heating section 11 of generally conventional construction. A double face corrugated web 12 is formed by joining a single face corrugated web 13 and a liner web 14. The flute tips of the corrugated medium of the single face web 13 are covered with a starch-based adhesive in an upstream glue machine (not shown) and the adhesive bonds between the glued flute tips and the liner web 14 are cured by the application of heat and pressure in the double backer 10. Heat is supplied from below by a series of heating units 15 having flat, coplanar heating surfaces 16 over which the joined double face web 12 travels through the double backer. The heating units typically comprise individual steam chests which are fabricated of a heavy-walled cast iron or steel construction, but may also comprise any suitable flat heated surface. Each steam chest has an open interior to which high pressure steam is supplied in a known manner and utilizing a steam supply system which is not shown. Each heating unit 15 may be 18–24" (about 406–610 mm) in length (in the direction of web movement) and have a width in the cross machine direction sufficient to fully support the maximum width of corrugated web to be processed (e.g. 96" or about 2500 cm). The total length of the heating section 11 may be about 40' (about 12 m).

Figure 1:
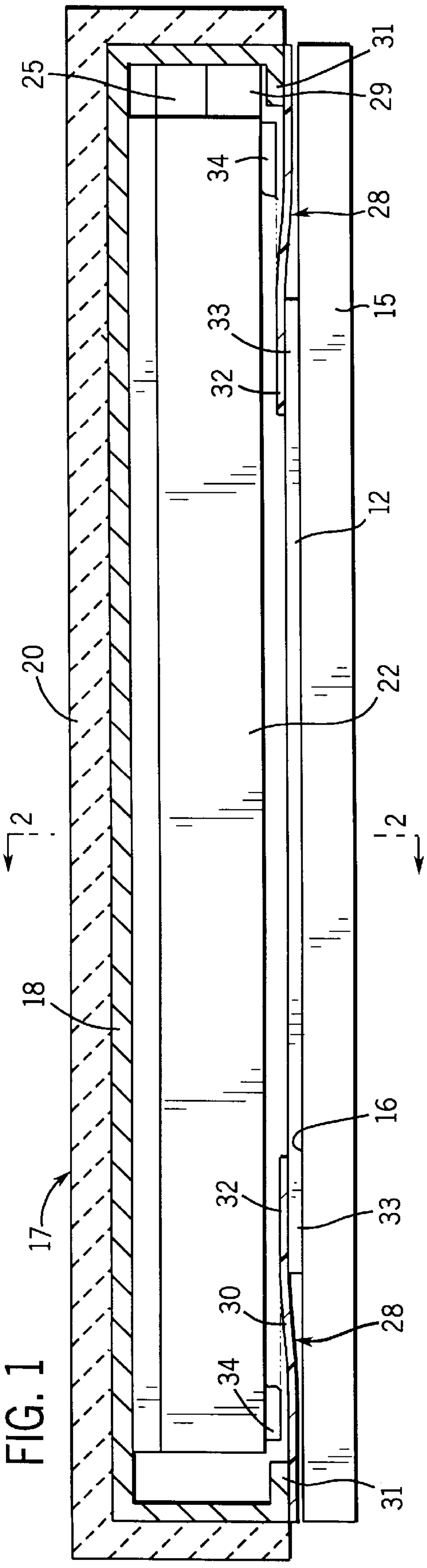
FIG. 1 is a vertical sectional view through a double backer of the present invention taken on a plane transverse to the direction of paperboard web movement.
Figure 2:
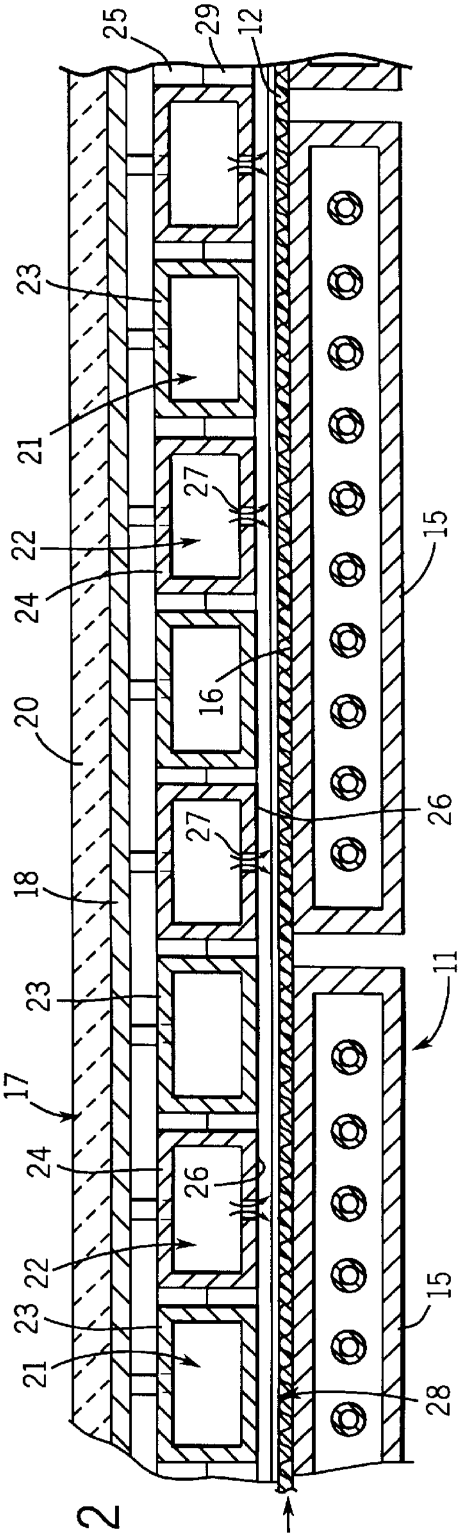
FIG. 2 is a vertical sectional detail taken on line 2—2 of FIG. 1.

In accordance with the present invention and referring also to FIGS. 1 and 2, heat and pressure are applied directly to the upper surface of the double face web 12 via a plenum 17 which overlies the entire heating section 11 of the double backer and thus overlies the entire length of the double face web in the heating section. The plenum 17 preferably includes a rigid metal housing 18 having a shape in lateral cross section (FIG. 1) of a shallow inverted U. The housing 18 is preferably enclosed by an outer insulating layer 20. The plenum housing 18 has a completely open bottom facing the double face web 12 which travels under the plenum over the surfaces 16 of the heating units.

The plenum housing 18 is preferably rigid enough so that the plenum may be suspended between its upstream and downstream ends to lie just above the heating units 15 in closely spaced relation to the surfaces 16. Referring particularly to FIG. 2, an array of alternate heating modules 21 and pressure modules 22 is supported within the plenum housing 18 along substantially the full length thereof. The heating modules may conveniently comprise steam heating tubes 23 which extend in the cross machine direction and are supplied with steam via a common steam manifold 29 from the same source as the lower heating units 15. Similarly, the pressure modules 22 may comprise air pressure tubes 24 positioned between the steam heating tubes 23. The air pressure tubes 24 may be supplied from a common air pressure manifold 25 within the plenum 17. The lower surfaces of the steam tubes 23 and air pressure tubes 24 are generally coplanar and lie closely spaced above the double face web 12 without contacting the web. The lower faces 26 of the air pressure tubes 24 are provided with a series of high velocity nozzles 27 to direct a uniformly distributed flow of air against the upper surface of the paperboard web 12. The compressed air provides a non-contact holddown force to press the liner web 14 into intimate contact with the freshly glued single face web 13, with heat provided from both below and above. Static air pressure within the plenum of about 3" of water 0.75 kPa) is adequate and substantially reduces the power requirements for the downstream web drive.

To enhance the effectiveness of the air pressure from the nozzles 27, flexible edge sealing members 28 are provided to seal the space between the plenum housing 18 and heating units 15. Each edge sealing member comprises a flexible membrane 30 which is attached along its outer edge to a flanged lower edge 31 of the plenum housing. The attachment preferably comprises a continuous seam running the full length of the housing. The laterally inner edge 32 of each flexible member 30 is positioned to overlie the adjacent lateral outer edge 33 of the double face web 12. The inner edge portion 32 of the membrane which overlies the paperboard web is exposed directly to the air pressure and is, therefore, forced into sealing engagement with the web to inhibit air leakage laterally out of the plenum. The sealing members 28 may, for example, have a width of about 24" (610 mm) such that, with a plenum width of about 96" (2500 mm), the membranes will provide edge sealing for corrugated paperboard webs as narrow as about 4' in width (about 1250 mm). The membranes 30 are preferably made of a tough synthetic material having a low coefficient of thermal expansion, such as KEVLAR. This membrane material may also be combined with a low friction material, such as TEFLON.

Both the upstream and downstream ends of the plenum housing 18 are provided with end seals 34 which enclose the ends of the plenum and extend downwardly into sealing engagement with the upper surface of the web 12. The plenum 17 may be suspended above the upper surfaces 16 of the heating units by a distance approximately equal to the thickness of the double face web 12. If the end seals 34 are mounted to extend downwardly to approximately the level of the flanged lower edges 31 of the plenum housing, the lower edges of the end seals may make light sealing contact with the double face web as the web moves under the plenum.

The plenum 17 may be carried between upstream and downstream supports 35. Each of the plenum supports includes a lift mechanism 36 allowing the plenum to be lifted vertically from its lower operative position to provide for initial web thread-up or maintenance of the apparatus, all in a manner well known in the art. The membrane supports 35 may also be used to apply tension to the membranes 30 in the machine direction to hold them in place.

A suitable web drive device, such as a vacuum conveyor, is preferably positioned immediately downstream from the downstream end of the heating section 11. Such vacuum conveyors are known in the art. However, the essentially no contact holddown provided by the apparatus of the present invention will reduce considerably the power required to pull the double face web through the system, as compared to stationary holddown systems which lie in direct contact with the web, because the static air pressure creating the load on the board does not cause a drag force. The small drag imposed by the edge seals is insignificant in comparison with the present state of the art.

I claim:

1. In a corrugated paperboard double backer having a heating surface supporting a moving double face corrugated paperboard web, a holddown apparatus comprising:

an open-bottom plenum overlying the web in the heating section and supported in vertical closely spaced relation to the heating surface;

a heating unit mounted in the plenum and adapted to provide a uniform distribution of heat to the upper surface of the paperboard web;

a source of pressurized gas connected to the plenum and a gas distribution arrangement operative to provide a uniformly distributed downwardly directed force against the upper surface of the paperboard web; and, flexible edge sealing members extending along both lateral edges of the plenum and extending laterally inwardly to free inner edges which overlie and overlap the respective outer lateral edges of the web.

2. The apparatus as set forth in claim 1 wherein said heating surface comprises a series of heating devices with coplanar heating surfaces aligned in the direction of web movement.

3. The apparatus as set forth in claim 2 wherein said heating devices and heating unit are steam heated.

4. The apparatus as set forth in claim 1 wherein said pressurized gas comprises compressed air and said distribution arrangement comprises an array of high velocity air nozzles.

5. The apparatus as set forth in claim 1 wherein each of said edge sealing members comprises a membrane attached to the plenum by a continuous seam along a later outer membrane edge.

6. The apparatus as set forth in claim 1 wherein said sealing members each comprise a membrane having an outer edge attached along one edge of the plenum and an inner edge resting upon an immediately adjacent edge portion of the paperboard web.

7. The apparatus as set forth in claim 1 wherein the plenum comprises a housing having a length approximately equal to the length of the heating surfaces, said housing having upstream and downstream ends attached to respective upstream and downstream supports, each of said supports including a lift device operative together to move the plenum and edge sealing members vertically and to adjustably set the plenum in operative position over the heating surfaces.

8. The apparatus as set forth in claim 7 including an insulating layer enclosing the plenum.

9. The apparatus as set forth in claim 1 upstream and downstream plenum end seals supported by the plenum and sealingly engaging the web to close the respective ends of the plenum.

10. A method for providing a holddown force on a corrugated paperboard web moving over and in contact with a heating surface in a heating section of a double backer, said method comprising the steps of:

(1) suspending an open-bottom plenum over the web in the heating section;

(2) heating the interior of the plenum;

(3) pressurizing the plenum to provide a uniformly distributed force against the upper face of the web; and, (4) sealing the interface between the lateral edges of the plenum and the web with flexible edge sealing members overlying and overlapping the lateral edges of the web.

11. The method as set forth in claim 10 including the step of sealing the upstream and downstream ends of the plenum with flexible end seals.

* * * * *